United States Patent
Netzer et al.

(10) Patent No.: US 6,978,311 B1
(45) Date of Patent: Dec. 20, 2005

(54) SCHEDULING IN A REMOTE-ACCESS SERVER

(75) Inventors: Arnon Netzer, Givat-Ela (IL); Reuven Moshkovich, Carmiel (IL)

(73) Assignee: Surf Communications Solutions, Ltd., Yokneam (IL)

( * ) Notice: Subject to any disclaimer, the term of this patent is extended or adjusted under 35 U.S.C. 154(b) by 0 days.

(21) Appl. No.: 09/501,078

(22) Filed: Feb. 9, 2000

(51) Int. Cl.[7] .............................................. G06F 15/16
(52) U.S. Cl. ...................... 709/232; 370/235; 370/328; 370/351; 370/391; 370/397; 370/399; 370/412; 709/201; 709/217; 709/224; 710/20; 710/58
(58) Field of Search ................................ 709/102–105, 709/201, 217, 219, 218, 232; 370/94, 412, 370/235, 328, 351, 391, 397, 399, 395.42; 710/20, 58

(56) References Cited

U.S. PATENT DOCUMENTS

| | | | | |
|---|---|---|---|---|
| 5,099,449 A | * | 3/1992 | Dembrosky et al. | |
| 5,166,930 A | * | 11/1992 | Braff et al. | |
| 5,386,517 A | * | 1/1995 | Sheth et al. | |
| 5,491,691 A | * | 2/1996 | Shtayer et al. | 370/395.42 |
| 5,563,885 A | * | 10/1996 | Witchy | |
| 5,568,402 A | * | 10/1996 | Gray et al. | |
| 5,712,851 A | * | 1/1998 | Nguyen et al. | |
| 5,745,758 A | * | 4/1998 | Shaw et al. | |
| 5,751,708 A | * | 5/1998 | Eng et al. | |
| 5,790,887 A | * | 8/1998 | Brech | |
| 5,832,262 A | * | 11/1998 | Johnson et al. | |
| 5,917,824 A | * | 6/1999 | Brueckheimer et al. | |
| 5,987,031 A | * | 11/1999 | Miller et al. | |
| 6,058,114 A | * | 5/2000 | Sethuram et al. | 370/397 |
| 6,115,360 A | * | 9/2000 | Quay et al. | |
| 6,128,749 A | * | 10/2000 | McDonnell et al. | |
| 6,157,963 A | * | 12/2000 | Courtright, II et al. | |
| 6,226,277 B1 | * | 5/2001 | Chuah | 370/328 |
| 6,262,986 B1 | * | 7/2001 | Oba et al. | 370/399 |
| 6,262,989 B1 | * | 7/2001 | Gemar et al. | 370/412 |
| 6,353,616 B1 | * | 3/2002 | Elwalid et al. | |
| 6,385,638 B1 | * | 5/2002 | Baker-Harvey | |
| 6,385,673 B1 | * | 5/2002 | DeMoney | |
| 6,457,037 B1 | | 9/2002 | Maytal | |
| 6,549,951 B1 | * | 4/2003 | Hui et al. | |
| 6,614,794 B1 | * | 9/2003 | Adas et al. | 370/399 |

* cited by examiner

Primary Examiner—Saleh Najjar
Assistant Examiner—Michael Won
(74) Attorney, Agent, or Firm—Fenster & Co.

(57) ABSTRACT

A method of scheduling the handling of data from a plurality of channels. The method includes accumulating data from a plurality of channels by a remote access server, scheduling a processor of the server to handle the accumulated data from at least one first one of the channels, once during a first cycle time, and scheduling the processor to handle the accumulated data from at least one second one of the channels, once during a second cycle time different from the first cycle time.

28 Claims, 4 Drawing Sheets

SCHEDULING IN A REMOTE-ACCESS SERVER

FIELD OF THE INVENTION

The present invention relates to communication systems and in particular to systems for handling remote access connections.

BACKGROUND OF THE INVENTION

Many providers of communication services employ one or more communication servers, such as remote access servers, access routers, and voice over IP gateways. The communication servers may act as modems, Fax handlers, voice over Internet Protocol (VoIP) servers and/or may provide any other communication services.

Some communication servers are multi-channel servers which have a capacity to concurrently handle a plurality of connections up to a predetermined maximal number. In addition, some communication servers, which are implemented mainly in software, for example, the servers of 3Com, Ascend, Access, ADI, Connexent, Telogy, and Hothaus, can concurrently handle different types of connections. Software based remote-access servers are generally implemented using a single processor, generally a signal processing processor such as a DSP, which is cheaper than a general purpose processor and is more suited for signal processing.

A multi-channel server, using a single processor, generally includes a scheduler which determines which channel is handled by the processor at any specific time. Usually, the channels are organized in a specific order and the processor, periodically, according to a scheduling cycle, provides a processing session to each of the channels in the specific order.

Different connections require processing time, i.e., handling of their received data, at different cycle times. For example, the ITU standard G723.1 connection requires handling of its data with a cycle of 30 milliseconds while the ITU standard G729A connection requires handling of its data with a 10 millisecond cycle. Some connections, e.g., modem and Fax connections, may operate over a large range of data rates and cycle times. All the channels must have their data processed during each cycle of their cycle time. A state in which a connection is not handled during one of its cycles is referred to as a starvation state. A connection which reaches a starvation state is generally disconnected or otherwise suffers from a degradation of service.

Some communication servers run on the processor an operating system which performs preemption. In such servers the scheduling of the processor to handle data from connections with different cycles may be lenient as the processor may interrupt the processing of data from one channel to handle data from another channel. Preemption, however, may require large percentages of the resources of the processor and therefore is wasteful.

Other communication servers limit themselves to connections which are processed with a single cycle time. Sometimes such servers are included in an array of servers each of which handles a different type of connections.

When a plurality of connections, which require handling of their data at different cycle times, are handled by the same server, the scheduler of the server chooses a longest scheduling cycle size of all the cycle times of the connections. Connections which require shorter cycle times are handled a plurality of time during each longest cycle rather than once during each of their own cycles. This, however, may involve degradation of the signals provided by the server for those connections, for example increasing their delay beyond allowed limits.

SUMMARY OF THE INVENTION

An aspect of some preferred embodiments of the present invention relates to a communication server which schedules processing sessions to different connections according to different scheduling schemes. In a preferred embodiment of the present invention, different connections handled by the server receive processing sessions at different scheduling cycles. Preferably, in normal operation conditions, the processor performs actual data processing of the data of the connections in substantially all the processing sessions. In a preferred embodiment of the invention, the scheduler allots processing sessions to connections according to two scheduling cycles: a short cycle and a long cycle.

In some preferred embodiments of the present invention, a longest cycle time of connections handled by the server is an integer multiple of the cycle times of the other connections handled by the server. Preferably, each longest cycle ends together with all the other cycles. Preferably, the percentage of time utilization of the server during a plurality of longest cycles which handle the same connections is substantially the same. Further preferably, the order of connections having scheduled processing sessions during a plurality of longest cycles which handle the same connections is substantially the same, when the quality of service (QoS) of the connections do not change. Thus, a scheduler managing the scheduling of processing sessions may determine an order of several connections to be handled one after the other, such that other modules of the server (e.g., a memory unit) may prepare resources for the processing, ahead of time.

An aspect of some preferred embodiments of the present invention relates to a method of determining whether to accept an incoming candidate connection, for handling by a server. The available processing time of the server and the required processing time of the candidate connection are determined and compared, and accordingly it is determined whether the candidate connection is accepted. In a preferred embodiment of the present invention, a criteria by which the server decides if it should accept the candidate connection is whether the available processing time of the server is larger than the required processing time of the connection by at least a safety margin. The safety margin is preferably of a length sufficient to prevent starvation of a connection when prevalent changes in the processing times of the connections currently handled by the server occur.

In a preferred embodiment of the present invention, the available processing time is determined by direct measurement. Alternatively or additionally, the available processing time is estimated based on the number of connections currently handled by the server and their average processing time utilization. In a preferred embodiment of the present invention, the determination of the available processing time is performed by the server. Alternatively or additionally, the determination is performed by a router which provides the incoming candidate connections to the server.

An aspect of some preferred embodiments of the present invention relates to a communication server which determines the order in which it processes data of various connections according to their quality of service (QoS). In a preferred embodiment of the invention, the order in which a plurality of connections are handled changes while they are being processed responsive in a change in the QoS of one or more connections.

There is therefore provided in accordance with a preferred embodiment of the present invention, a method of scheduling the handling of data from a plurality of channels, including accumulating data from a plurality of channels by a remote access server, scheduling a processor of the server to handle the accumulated data from at least one first one of the channels, once during a first cycle time, and scheduling the processor to handle the accumulated data from at least one second one of the channels, once during a second cycle time different from the first cycle time.

Preferably, the first cycle begins concurrently with a second cycle. Preferably, the first cycle time is an integer multiple of the second cycle time. Preferably, scheduling the processor to handle the accumulated data includes scheduling the processor, during the second cycle, to handle the accumulated data of substantially all the at least one second channels, before scheduling the processor to handle data from any other channels.

Preferably, scheduling the processor to handle the accumulated data from the at least one first one of the channels includes checking whether the second cycle has elapsed and scheduling the processor to handle the accumulated data from one the at least one first one of the channels only if the second cycle has not elapsed. Preferably, the at least one first one of the channels includes a plurality of first channels and the at least one second one of the channels includes a plurality of second channels. Preferably, the scheduling includes scheduling the processor to handle the accumulated data of at least one of the second channels at least twice before handling data from at least one of the first channels. Preferably, scheduling the processor to handle the accumulated data includes allowing the processor to utilize up to a predetermined amount of processing time of the processor for each channel.

Preferably, the processor does not run an operating system which performs preemption.

Preferably, scheduling the processor includes having the processor wait without processing data from any of the channels if all the channels were processed during their respective current cycles. Preferably, the method includes measuring the amount of time in the first cycle time in which the processor is waiting and using the measured time in determining whether to accept handling data from an additional channel. Preferably, the scheduling is performed without interrupting the processor in the middle of handling accumulated data from a different channel. Preferably, the method includes processing an entire block of accumulated data of the scheduled channel responsive to the scheduling.

There is further provided in accordance with a preferred embodiment of the present invention, a method of scheduling the handling of a plurality of connections, including accumulating data from a plurality of channels by a remote access server which includes a processor which does not run an operating system which performs preemption, and scheduling the processor to process data from a first one of the channels at least twice, without scheduling the processor to process data from a second one of the channels, therebetween.

Preferably, scheduling the processor includes scheduling the processor to handle data from the first one of the channels once during a first cycle time and scheduling the processor to handle data from the second one of the channels once during a second cycle time shorter than the first cycle time. Preferably, the method includes processing an entire block of accumulated data of the scheduled channel responsive to the scheduling.

There is further provided in accordance with a preferred embodiment of the present invention, a remote access server, including a plurality of channel drivers which accumulate data from respective channels, a processor which processes the accumulated data, and a scheduler which schedules the processor to handle accumulated data from a first channel once during a first cycle time and data from a second channel once during a second cycle time different from the first cycle time, wherein the scheduler does not interrupt the operation of the processor while it is processing data from a channel.

Preferably, the scheduler schedules the processor to handle the data from the first channel at least twice before scheduling the processor to handle data from the second channel.

There is further provided in accordance with a preferred embodiment of the present invention, a method of determining, by a remote access server, whether to accept an incoming connection, including determining an amount of unused processing time of a processor of the server, and determining whether the amount of unused processing time is sufficient to handle the incoming connection.

Preferably, determining the amount of unused processing time includes determining by the processor. Preferably, determining the amount of unused processing time includes measuring time in which the processor does not process data from any connection.

Preferably, determining the amount of unused processing time includes estimating the amount of time based on a number of connections being handled by the server and/or based on the types of the connections being handled by the server.

Preferably, determining whether the amount of unused processing time is sufficient to handle the incoming connection includes determining whether the amount of unused processing time exceeds an amount sufficient to handle the incoming connection at least by a predetermined safety margin. Preferably, the safety margin has a size determined responsive to a number of connections being handled by the server.

There is further provided in accordance with a preferred embodiment of the present invention, a method of scheduling the handling of data, by a remote access server tracking a short cycle and a long cycle, from a plurality of channels including at least one short cycle channel and at least one long cycle channel, including accumulating data from the plurality of channels by the server, scheduling a processor of the server to handle the accumulated data from all the short cycle channels, determining whether a current short cycle has elapsed after scheduling the server to handle the data from all the short cycle channels, and scheduling the processor to handle the accumulated data from a long cycle channel if the current short cycle did not elapse, if there is a long cycle channel which was not processed yet during the current long cycle.

Preferably, the method includes determining whether the current short cycle has elapsed after scheduling the server to handle the data from the long cycle channel, and scheduling the processor to handle the accumulated data from an additional long cycle channel, if the current short cycle did not elapse.

Preferably, the method includes waiting, after scheduling the server to handle the data from all the short cycle channels, until the beginning of the next short cycle without processing data from any channel, if all the long cycle channels were already processed during the current long cycle. Preferably, the long cycle begins concurrently with a short cycle. Preferably, the long cycle time is an integer multiple of the short cycle time.

There is further provided in accordance with a preferred embodiment of the present invention, a method of scheduling the handling of a plurality of connections, including accumulating data from a plurality of channels by a remote access server, determining for at least one of the connections a quality of service level, and scheduling the processor to process data from the plurality of connections in an order determined responsive to the determined quality of service level.

Preferably, the scheduling includes scheduling the processor to handle data from at least one first connection before handling data from at least one second connection having a lower quality of service level than the at least one first connection.

Preferably, the method includes changing the quality of service level of at least one of the connections while accumulating the data and changing the order of scheduling responsive to the change in the quality of service level.

BRIEF DESCRIPTION OF FIGURES

The invention will be more clearly understood by reference to the following description of preferred embodiments thereof in conjunction with the figures, in which.

DETAILED DESCRIPTION OF THE PREFERRED EMBODIMENTS

Figure 1:
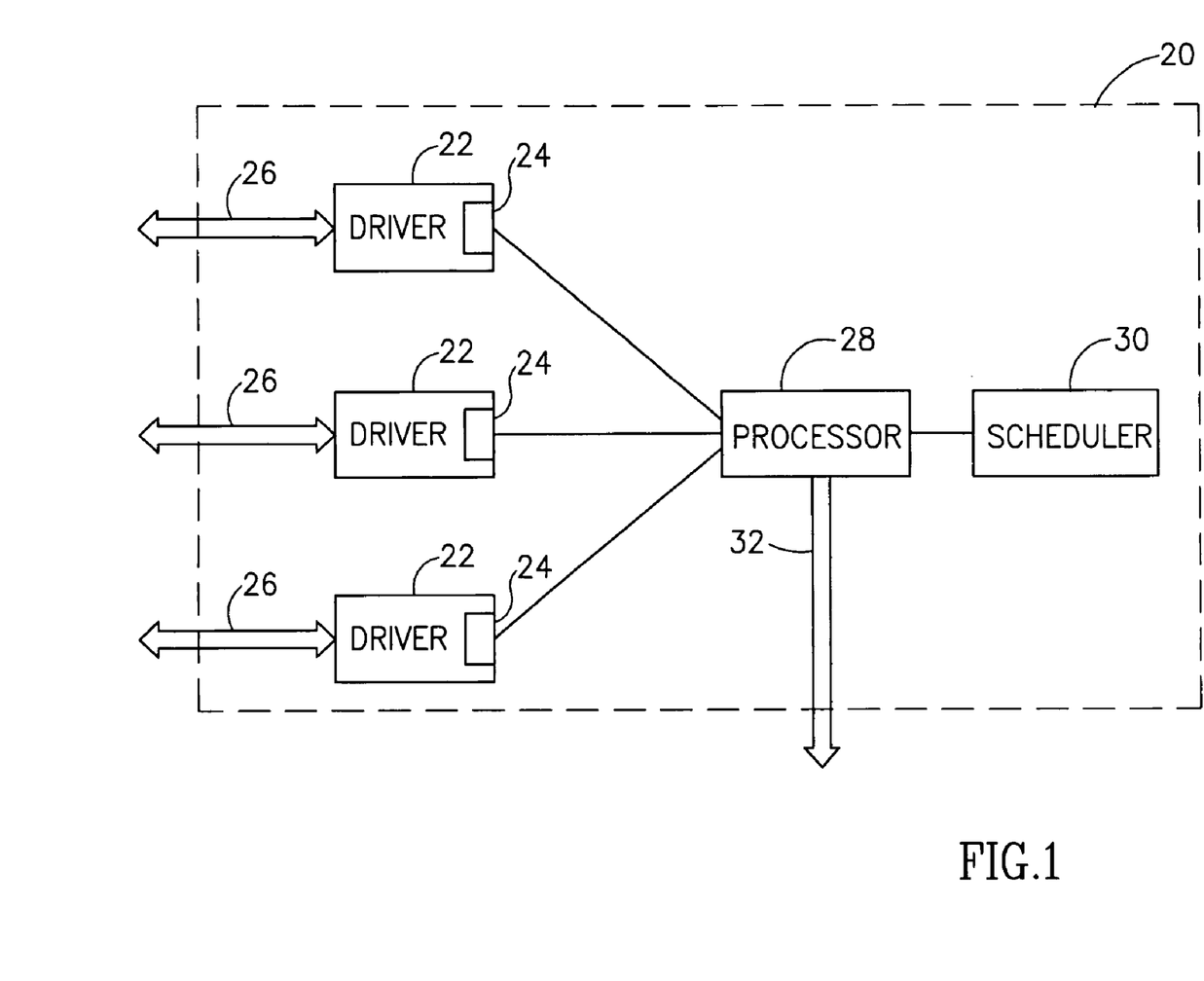
FIG. 1 is a schematic illustration of a connection handling server, in accordance with a preferred embodiment of the present invention.

FIG. 1 is a schematic illustration of a connection handling server 20, in accordance with a preferred embodiment of the present invention. Server 20 comprises a plurality of drivers 22, preferably run on processor 28, which accumulate raw data from incoming connections passing on channels 26. Server 20 may be employed as a stand alone server or may be used as part of an array of servers, of the same or different types. The array of servers is preferably used with a channel router, of any type known in the art, for example, the router described in Israel patent application 132,888, filed Nov. 11, 1999, which is assigned to the assignee of the present application, and the disclosure of which is incorporated herein by reference. Preferably, the raw data is accumulated in respective buffers 24 of drivers 22. Server 20 includes a processor 28 which processes the received data from each of the connections. The processing decodes (and/or performs other processing on) the incoming raw data and provides the decoded data on an output 32 of server 20. The data accumulated from each channel must be processed within a predetermined time in order to prevent buffer 24 of its respective driver 22 from overflowing and to ensure proper handling of the connection by server 20. A scheduler 30, which is preferably run on processor 28, sets the order in which processor 28 schedules processing sessions to the connections, and optionally the durations of the sessions. It will be understood that the durations of the sessions for different connections may be different. Furthermore, the durations of sessions of a single connection in different cycles may be different.

Each connection preferably has an associated cycle time, such that in each cycle the connection receives a processing session. It is noted, however, that the connection does not necessarily receive the processing session at the same time point within each cycle. In a preferred embodiment of the invention, the connections handled by server 20 have either a short cycle or a long cycle. Preferably, the cycle sizes of the connections are integer multiples of each other (e.g., the long cycle is an integer multiple of the short cycle). The cycle schedules preferably overlap such that each long cycle begins at the same time as a short cycle and contains an integer number of short cycles. In the following description, the connections will be referred to according to their cycles, i.e., long cycle connections and short cycle connections. Scheduler 30 preferably operates a clock which keeps track of the short and long cycles.

Figure 2:
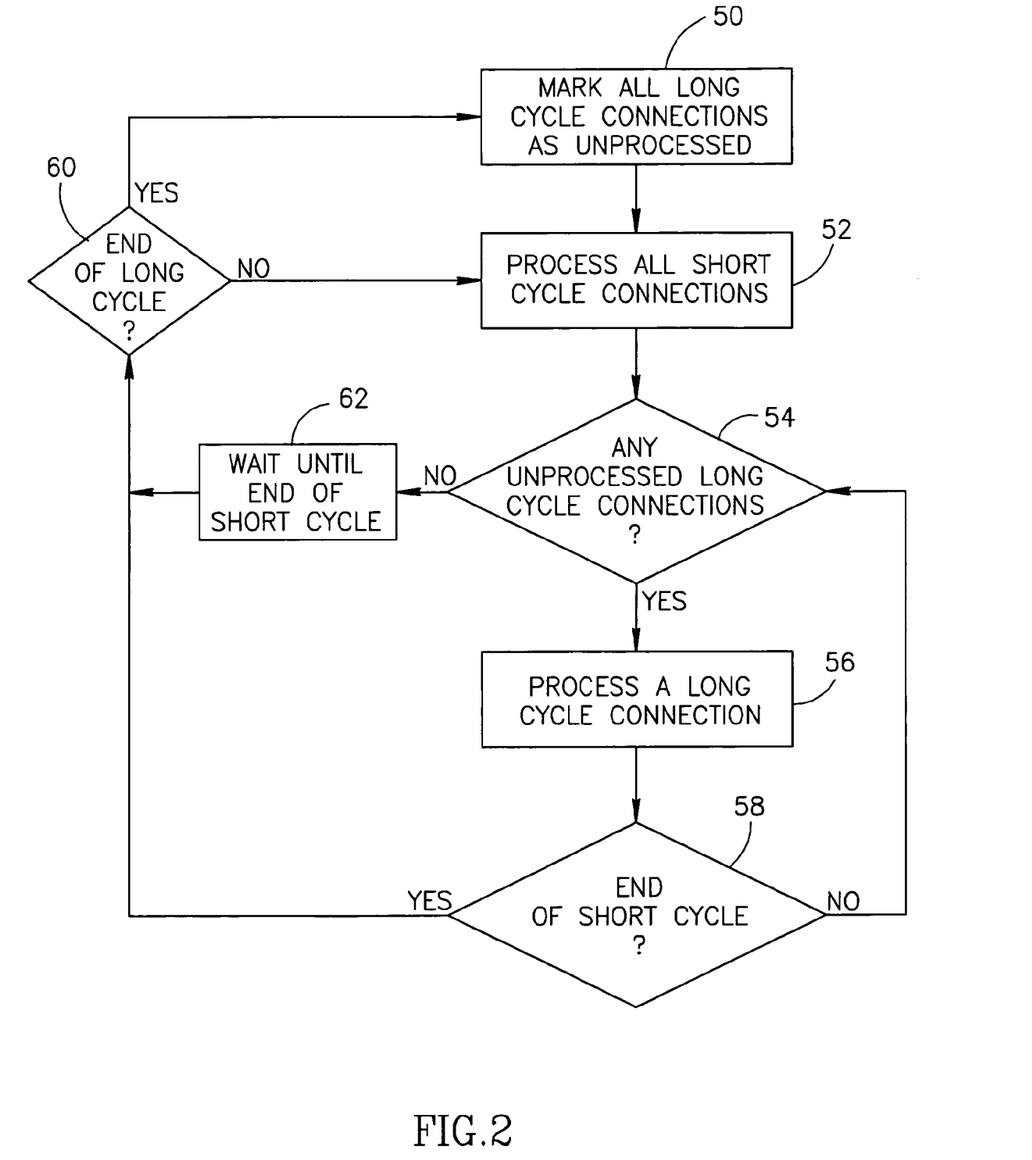
FIG. 2 is a flowchart of the actions performed by a scheduler in the server of FIG. 1, in accordance with a preferred embodiment of the present invention.

FIG. 2 is a flow chart of the actions performed by scheduler 30, in accordance with a preferred embodiment of the present invention. At the beginning of each long cycle, scheduler 30 marks (50) all the long cycle connections as unprocessed. Thereafter, scheduler 30 preferably allocates (52) processing sessions on processor 28 to each of the short cycle connections, sequentially.

After all the short cycle connections receive processing sessions, scheduler 30 preferably determines whether (54) any long cycle connections are marked as unprocessed. If there is at least one unprocessed long cycle connection, scheduler 30 chooses a long cycle connection to receive a processing session (56) and processor 28 processes the data of the chosen connection. After the processing of the long cycle connection, scheduler 30 checks (58) whether the current short cycle has elapsed. If the current short cycle has elapsed, scheduler 30 again allocates (52) processing sessions to each of the short cycle connections. If (60) the end of the current short cycle ends a long cycle, scheduler 30 marks (50) all the long cycle connections as unprocessed before allocating processing sessions to the short cycle connections. If the current short cycle has not elapsed (58), another long cycle connection is allocated a processing session, if an unprocessed connection exists. Otherwise, processor 28 waits (62) until the end of the current short cycle.

Generally, when scheduler 30 allocates a processing session to a connection, the connection utilizes an amount of processing time according to its needs. That is, in different cycles the connection may utilize different amounts of processing time. Furthermore, in some cycles the connection may totally forego the processing session it was allocated, and the scheduler preferably continues by scheduling processing sessions to another connection without waiting.

Preferably, once scheduler 30 allocates the use of processor 28 to a channel, the scheduler does not interrupt the processing of that channel until the processing of the channel is completed, even if the end of a short cycle has been reached. Further preferably, processor 28 does not run an operating system which performs preemption.

In some preferred embodiments of the present invention, a maximal limit is placed on the processing time which may be used by a connection in a single processing session. In a preferred embodiment of the present invention, the maximal processing time used by a connection during a processing session is substantially equal to the length of the long cycle divided by the number of connections handled by server 20.

Figure 3:
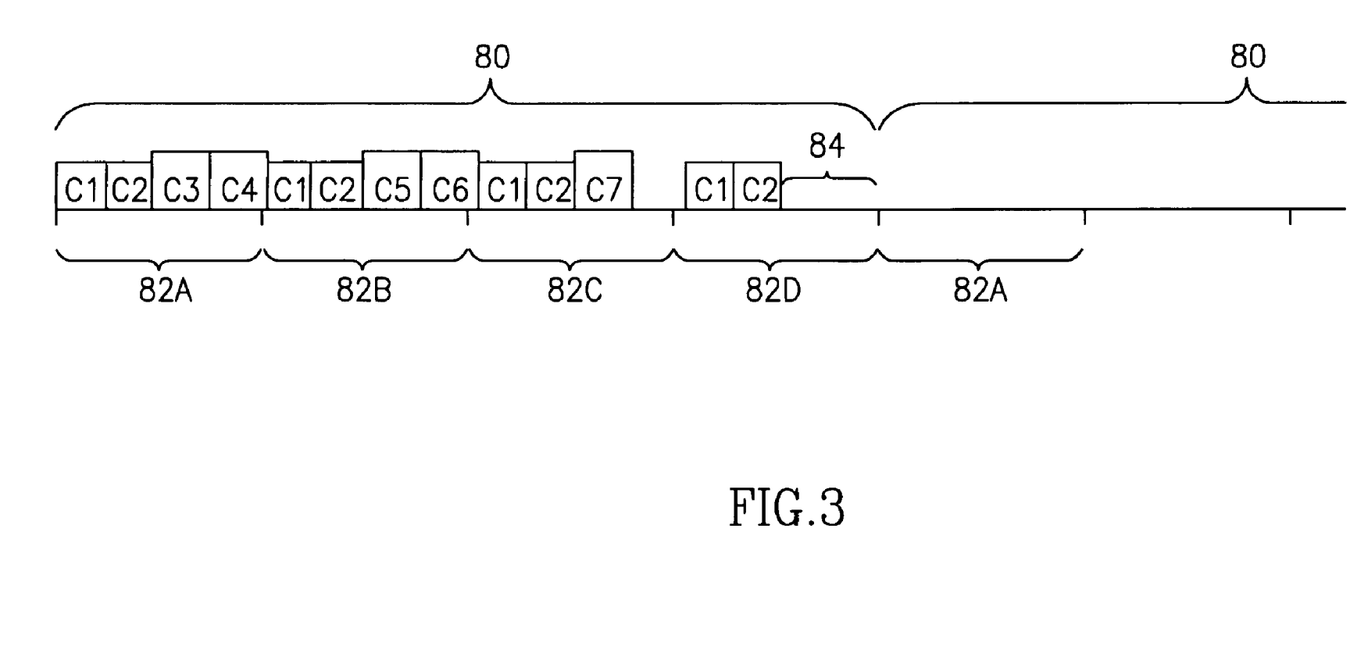
FIG. 3 is a schematic time chart illustrating the operation of a scheduler of the server of FIG. 1, in accordance with a preferred embodiment of the present invention.

Referring additionally to FIG. 3, FIG. 3 is a schematic time chart illustrating the operation of scheduler 30 on two short cycle connections (C1, C2) and five long cycle connections (C3, C4, C5, C6 and C7), in accordance with a preferred embodiment of the present invention. A long cycle 80, which is for example 20 milliseconds long, includes, for example, four short cycles (82A, 82B, 82C and 82D) of 5 milliseconds each. At the beginning of each long cycle 80, the two short cycle channels C1 and C2 are processed. Thereafter long cycle channels C3 and C4 are processed. After channel C4 is processed, short cycle 82A has already elapsed. Therefore, channels C1 and C2 are again processed. Although the time between consecutive processing sessions of channels C1 and C2 in cycles 82A, 82B and 82C are longer than their cycle the channels do not starve, as they receive a processing session during each cycle.

Two more long cycle channels C5 and C6 are then processed, as there is sufficient time to begin their processing before the end of short cycle 82B. After short cycle 82B has elapsed, channels C1 and C2 are again processed. Afterwards, long cycle channel C7 is processed. Since there are no more long cycle channels which were unprocessed, processor 28 remains idle until the end of short cycle 82C. In short cycle 82D, only channels C1 and C2 are processed and processor 28 remains idle until the end of long cycle 80. In a next long cycle 80 this process is repeated.

As described above, at least one long cycle channel is allocated a processing session (if an unprocessed connection remains) during each short cycle. Alternatively, scheduler 30 checks (58) whether the current short cycle elapsed, before checking (54) whether any unprocessed long cycle connections remain. In a preferred embodiment of the invention, scheduler 30 checks (58) whether the current short cycle elapsed before checking (54) whether any unprocessed long cycle connections remain only for the second and later short cycles of a long cycle. This is because, if at least one long cycle connection is being handled by server 20, it is substantially impossible that the first short cycle (82A) will elapse before the processing of one or more long cycle connection begins.

In a preferred embodiment of the invention, marking (50) all the long cycle connections as unprocessed comprises initializing the control and status of the channels handling the connections.

In some preferred embodiments of the invention, the short and/or long cycle connections are allocated processing sessions in a fixed order such that in all the long cycles 80 the order of processing is the same. Preferably, the processing order is determined according to the quality of service (QoS) levels of the respective connections, such that connections with a high QoS are processed before connections with lower QoS. Thus, if due to unexpected extreme changes in the processing times required by the connections, one of the connections suffers from starvation, it will then be a connection with lowest QoS.

The QoS of a connection may change during the handling of the connection by server 20. When such a change occurs, the position of the connection in the order of connections to be processed in further cycles is preferably adjusted responsive to the change in the QoS.

In some preferred embodiments of the invention, scheduler 30 keeps track of the utilization level of processor 28. In a preferred embodiment of the invention, scheduler 30 determines for each long cycle 80, the amount of idle time during which processor 28 is waiting (62), i.e., not processing any channel. In addition, scheduler 30 preferably determines the idle time 84 in the short cycle which is least utilized, i.e., the last short cycle 82D within a long cycle. The determined idle times are preferably used in determining whether an additional channel may be handled by server 20. In a preferred embodiment of the invention, the idle time during a long cycle 80 is represented as a percentage of the length of the cycle, such representation is easily used as a measure of the efficiency of server 20. Alternatively or additionally, the idle time is represented in absolute times.

Alternatively or additionally to determining the time in which processor 28 is idle, scheduler 30 keeps track of the number of connections being processed by server 20 and the processing time of each connection. Accordingly, scheduler 30 calculates the current (and expected) idle time of processor 28. Preferably, scheduler 30 is notified of any change in the processing time utilized by one of the connections, so that it can precisely track the idle time of the processor. For example, scheduler 30 keeps track of addition and removal of connections, changes in the cycle lengths of the connections and changes in the processing times of the connections in each cycle.

In a preferred embodiment of the invention, the idle times are determined based on approximations. For example, scheduler 30 may not be able to know the exact processing time required by each connection, and instead uses average processing times according to the types of the connections (e.g., fax, modem, VoIP).

Figure 4:
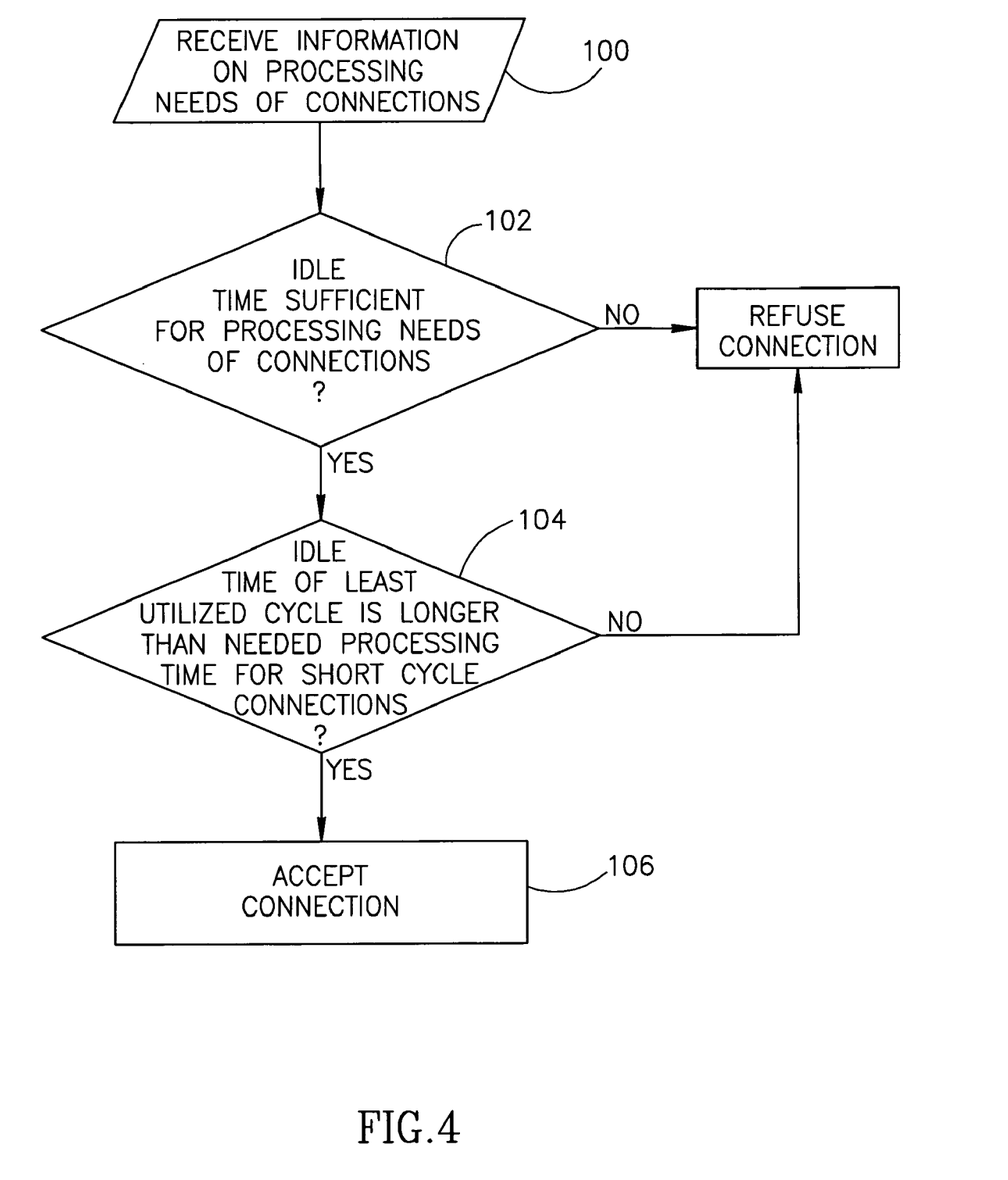
FIG. 4 is a flowchart of the actions performed by a server in determining whether to accept an incoming connection, in accordance with a preferred embodiment of the present invention.

FIG. 4 is a flowchart of the actions performed by server 20 in determining whether to accept an incoming candidate connection, in accordance with a preferred embodiment of the present invention. Preferably, server 20 receives (100) for each of the incoming connections, its cycle length, i.e., whether the connection requires processing every short cycle or long cycle, and its average required processing time per cycle. Scheduler 30 preferably determines (102) whether the idle time during a recent long cycle is sufficient in order to process the incoming connection. That is, if the incoming connection is a long cycle connection, scheduler 30 determines whether the average required processing time of the incoming connection is shorter than the available idle time of the recent long cycle. If, however, the incoming connection is a short cycle connection, scheduler 30 preferably determines whether the average required processing time multiplied by the number of short cycles in a long cycle is shorter than the available idle time of the recent long cycle.

Preferably, if the candidate incoming connection is a short cycle connection, scheduler 30 also verifies (104) that the idle time 84 of the least utilized cycle is longer than the average required processing time. If there is enough time to handle the incoming connection, the connection is accepted (106). Otherwise the incoming connection is refused by server 20. Such refusal may result in a busy signal or in passing the incoming connection to a different server by a controlling router.

In a preferred embodiment of the invention, the method of FIG. 4 is also performed when a connection requests to switch from receiving processing time each long cycle to receiving processing time each short cycle. Alternatively or additionally, the method of FIG. 4 is also performed when a connection requests to switch from receiving processing time each short cycle to receiving processing time each long cycle. In a preferred embodiment of the present invention, the method of FIG. 4 is performed when a connection requests to increase its processing time utilization during long cycles. Such increase may be due, for example, to switching between receiving processing time each short cycle and receiving processing time each long cycle and/or to a change in the type of the connection (e.g., an increase or decrease in the transmission rate of the connection) or due to any other reason.

In some preferred embodiments of the invention, scheduler 30 accepts an incoming connection only if a predetermined amount of reserve processing time will remain after the incoming connection is accepted. The reserve processing time is required in case one or more of the existing connections will require additional processing time. For example, the reserve processing time may be used in case an existing connection switches from receiving processing time each long cycle 80 to each short cycle 82, or when an existing connection requires a longer processing time during each cycle.

In a preferred embodiment of the present invention, one or more connections may require processing periods which vary between cycles. Such connections are preferably evaluated based on their average utilization. The reserve processing time protects against starvation in case the processing utilization temporarily increases during one or more long cycles 80.

In a preferred embodiment of the invention, the amount of processing time reserved by scheduler 30 depends on the number of connections handled by server 20. Alternatively or additionally, the amount of reserved processing time depends on the number of handled connections which are utilizing substantially less processing time than a maximal amount of processing time which may be utilized by a connection. In a preferred embodiment of the invention, the amount of reserved processing time depends on the number of channels which are processed during long cycles 80 and which may be converted to short cycles 82.

Preferably, if a channel suffers from starvation, the driver 22 of the channel is reset, and the connection is thus disconnected. In a preferred embodiment of the present invention, the amount of reserve processing time is chosen in order to achieve a predetermined chance of channel starvation. For example, a user may choose to use a relatively large amount of reserve processing time in order to prevent channel starvation at the expense of being able to handle fewer connections concurrently. Alternatively, a small amount of reserve time is used in order to maximize the number of connections handled by server 20 although allowing a higher starvation chance.

In a preferred embodiment of the invention, the lengths of long cycle 80 and/or of short cycle 82 may be changed by a system manager of server 20 when the server is not in use. Such a change may include changing the length of long cycle 80 and/or of the number of short cycles 82 within a single long cycle 80. Alternatively or additionally, the lengths of long cycle 80 and/or of short cycle 82 may be changed during the operation of server 20. Preferably, before changing the length of either of cycles 80 or 82, processor 28 verifies that such a change will not cause starvation to any of the connections currently handled by the processor.

In a preferred embodiment of the invention, all of drivers 22 accumulate the data at a common sampling rate. In an exemplary embodiment, the sampling rate of drivers 22 is 8 kHz, the length of short cycle 82 is 5 msec and the length of long cycle 80 is 20 msec. Thus, in each short cycle drivers 22 accumulate 40 samples and in each long cycle the drivers accumulate 160 samples.

It is noted that each connection must receive a processing session during every cycle (large or small), but the amount of time between consecutive processing sessions of a connection may be larger than the cycle. The interval between two consecutive processing sessions of a connection may be, under some conditions, close to twice the cycle of the connection. Therefore, the largest cycle allowed by a connection is preferably about half the largest allowed interval between two consecutive processing sessions of the connection. It is further noted that the time between consecutive processing sessions may be shorter than a cycle, for example, when a different connection is disconnected from server 20 or when the QoS of one or more of the connections, changes.

In a preferred embodiment of the invention, each time processor 28 processes a connection, it processes only a single block including samples accumulated in a single cycle (or less if there are only fewer samples), even if more samples have been accumulated in the respective buffer 24. Thus, the processing time required to process a connection is substantially constant, simplifying the estimation of the processing time required by each connection. Preferably, the single block of the connection processed by processor 28 comprises a block of symbols accumulated during a previous cycle of the cycle scheme of the connection. Thus, the same data samples of the connection are processed by processor 28 regardless of the relative time in its cycle in which the processor is scheduled to handle the data of the connection.

Alternatively, processor 28 processes substantially all the samples accumulated by server 22, each time the channel is processed. Further alternatively, processor 28 determines whether to process all the accumulated samples or only a single block, according to the amount of idle time of the processor. In a preferred embodiment of the invention, processor 28 processes all the accumulated samples of a long cycle connection only for those long cycle connections processed during the last short cycle 82D of each long cycle (provided there is sufficient idle time of the processor).

Although the above description refers to connections having either a short cycle or a long cycle, some preferred embodiments of the invention may be implemented with three or more different cycles.

In some preferred embodiments of the present invention suitable for substantially any number of different cycles, scheduler 30 (FIG. 1) manages a table which lists, for each channel, the cycle of the channel. Each time scheduler 30 must choose a channel to be processed it determines, for each channel, the time remaining until the end of the respective cycle of the channel. Scheduler 30 preferably chooses the channel which has the least time remaining until the end of its respective cycle, provided the remaining time is not longer than the channels cycle.

In a preferred embodiment of the present invention, the table of scheduler 30 lists the QoS of each channel. Preferably, when a plurality of channels have the same (shortest) time remaining until the end of their respective cycle, the processor is preferably scheduled to process the channel with the highest QoS. In a preferred embodiment of the present invention, when two or more channels have the same cycle and the same QoS, the scheduler selects one of the channels randomly. Alternatively, scheduler 30 assigns an arbitrary order to each of the two or more channels such that the scheduler substantially always schedules the two or more channels in the same order. Alternatively or additionally, the table of scheduler 30 lists the most recent time in which each channel was handled. When a plurality of channels are otherwise with equal right for processing, the channel waiting for processing for the longest duration, precedes.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. Variations of embodiments described will occur to persons of the art. Furthermore, the terms "comprise," "include," "have" and their conjugates, shall mean, when used in the claims, "including but not necessarily limited to." The scope of the invention is limited only by the following claims:

What is claimed is:

1. A method of scheduling the handling of a plurality of connections, comprising:
   accumulating data from a plurality of connections, requiring handling in each cycle of a respective cycle scheme of the connection, by a remote access server;
   determining quality of service levels of a plurality of the connections; and
   scheduling the processor to process data from the plurality of connections in an order determined responsive to relative values of the determined quality of service levels,
   wherein scheduling the process to process data comprises scheduling in two stages comprising:
      a first stage including determining possible scheduling options at least partially responsive to the respective cycle schemes of the connections, but without relation to the determined quality of service levels; and
      a second stage, following the first stage, including determining a scheduling order responsive to the determined possible scheduling options at least partially responsive to relative values of the determined plurality of service levels.

2. A method according to claim 1, wherein the scheduling comprises scheduling the processor to handle the accumulated data from a first one of the connections at least twice before scheduling the processor to handle data from a second one of the connections.

3. A method according to claim 1, wherein scheduling the processor to handle the accumulated data comprises allowing the processor to utilize up to a predetermined amount of processing time for each connection.

4. A method according to claim 1, wherein the processor does not run an operating system which performs preemption.

5. A method according to claim 1, wherein scheduling the processor comprises having the processor wait without handling data from any of the connections if all the connections were scheduled for handling during their respective current cycles, although one or more of the connections has data requiring handling.

6. A method according to claim 5, comprising measuring the waiting time of the processor in a first cycle and using the measured waiting time in determining whether to accept handling data from an additional connection.

7. A method according to claim 1, comprising processing an entire block of accumulated data of the scheduled connection responsive to the scheduling.

8. A method according to claim 1, wherein the scheduling comprises scheduling the processor to handle data from at least one first connection before handling data from at least one second connection having a lower quality of service level than the at least one first connection.

9. A method according to claim 1, comprising changing the quality of service level of at least one of the connections while accumulating the data and changing the order of scheduling responsive to the change in the quality of service level.

10. A method according to claim 1, wherein the plurality of connections connect to the remote access server through separate physical links.

11. A method according to claim 1, wherein the processing time of a connection does not affect the connection operation, provided the connection is processed within its respective cycle.

12. A method according to claim 1, wherein at least two of the plurality of connections have same cycle times beginning concurrently.

13. A method according to claim 1, wherein at least two of the plurality of connections have different cycle times.

14. A method according to claim 1, wherein the processor handles the data of each connection it is assigned, without interruption for handling data of a different connection.

15. A method according to claim 1, wherein scheduling the processor comprises scheduling each connection once during each of its respective cycles.

16. A method according to claim 1, comprising changing the cycle time of at least one of the connections, during its operation.

17. A method according to claim 1, wherein scheduling the processor comprises scheduling in an order determined responsive to the time remaining until the end of the respective cycle of each of the connections.

18. A method according to claim 17, wherein scheduling the processor comprises scheduling in an order determined responsive to the relative values of the quality of service levels when the time remaining until the end of the respective cycle is substantially the same for a plurality of connections.

19. A method according to claim 1, wherein scheduling the processor comprises scheduling the processor to process a connection waiting a longest time for processing, when a plurality of connections are otherwise with equal right for processing.

20. A method according to claim 1, wherein scheduling the processor comprises giving precedence to connections having a high quality of service level.

21. A method according to claim 1, wherein determining the quality of service levels comprises accessing a table listing the quality of service level for each connection.

22. A method according to claim 1, comprising changing the desired quality of service level of at least one of the connections, and scheduling the processor to process data from the plurality of connections in a second order adjusted responsive to the change in the desired quality of service level.

23. A method according to claim 1, wherein the scheduling order does not affect the data rates of the connections.

24. A remote access server, comprising:
   a plurality of channel drivers which accumulate data from respective channels;
   a processor which handles the accumulated data; and
   a scheduler which determines for at least one of the channels a quality of service level and schedules the processor to handle data of the channels in an order determined according to the determined quality of service level,
   wherein the scheduler determines for a plurality of the channels a quality of service level, determines one or more possible scheduling options of the plurality of connections responsive to the respective cycle schemes of the connection and schedules the processor to handle data of the channels in accordance with one of the determined possible scheduling options, selected according to the determined quality of service levels.

25. A server according to claim 24, wherein the plurality of channel drivers accumulate data from respective separate physical links.

26. A server according to claim 24, wherein the scheduler is adapted to change the handling order responsive to a change in quality of service.

27. A server according to claim 24, comprising a table which lists a quality of service level for each connection.

28. A server according to claim 24, wherein the scheduler schedules the processor to handle data of the channels in an order determined according to the relative quality of service levels of the channels.

* * * * *